UNITED STATES PATENT OFFICE.

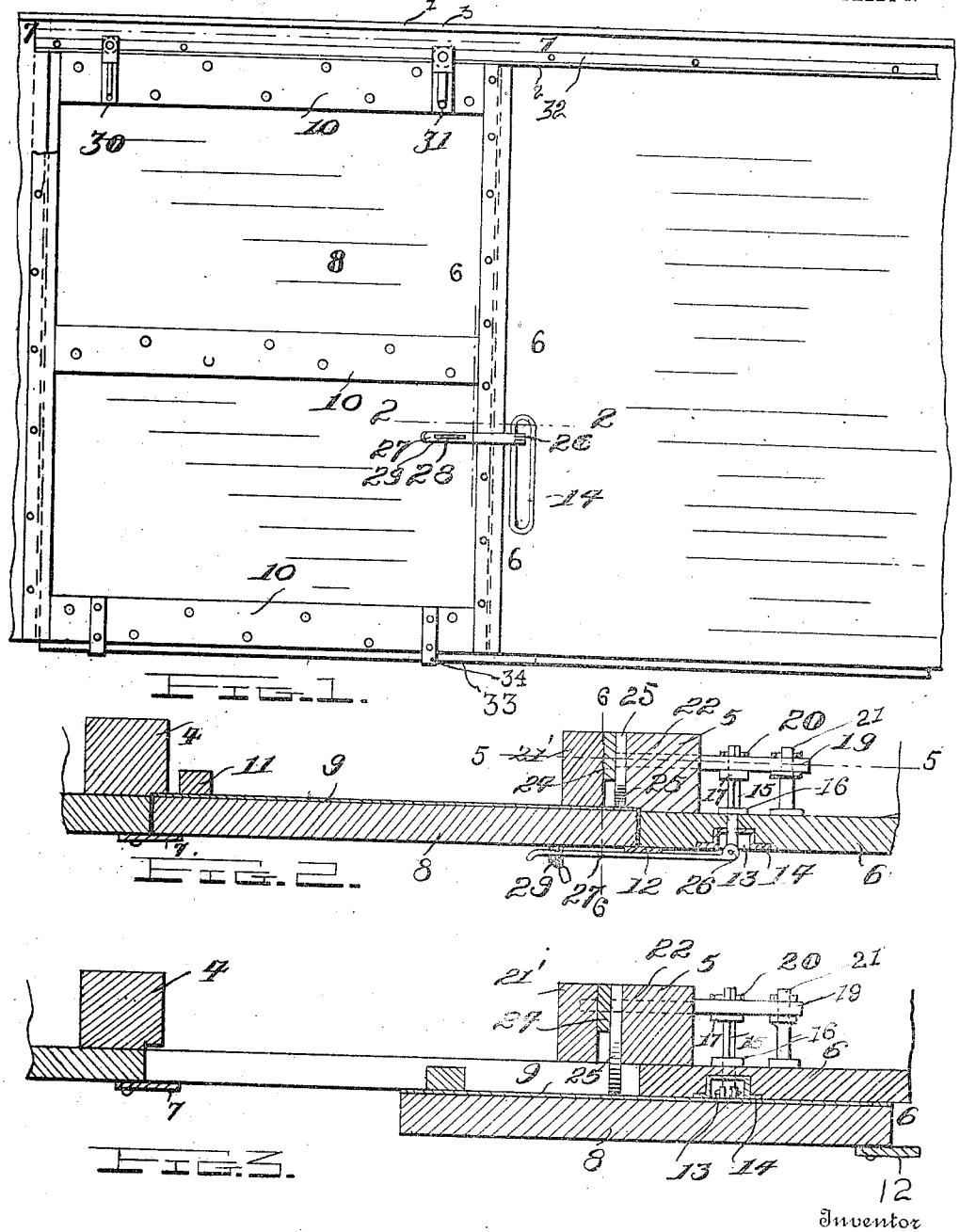

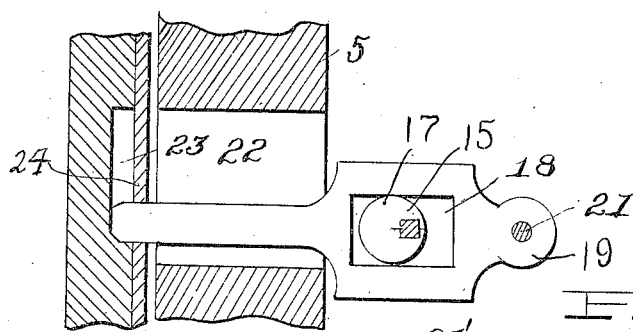
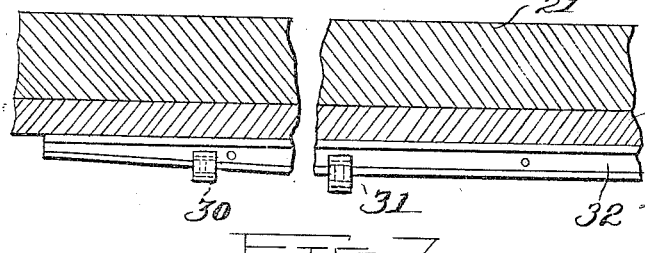
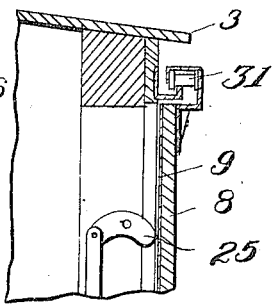
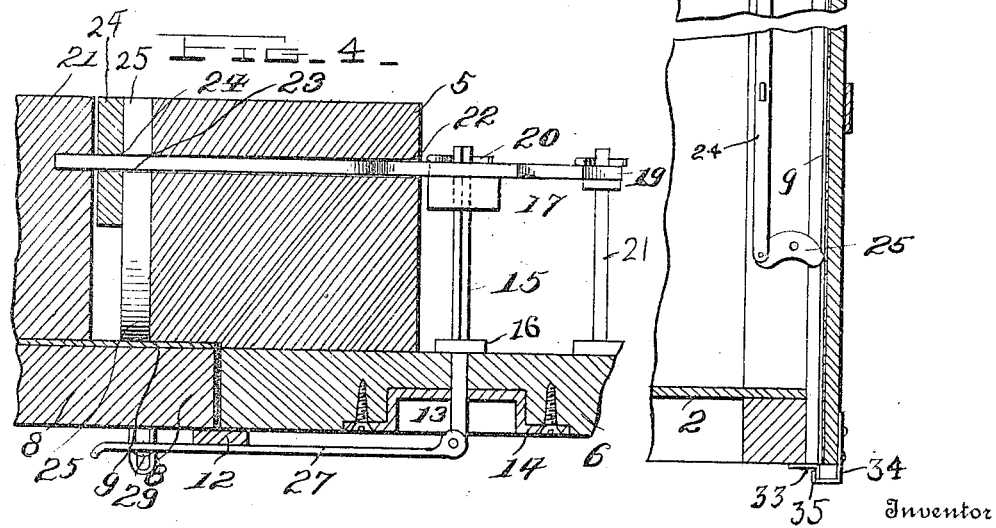

CHARLES E. GRIFFITH, OF PHILADELPHIA, PENNSYLVANIA.

CAR-DOOR.

1,060,181.  Specification of Letters Patent.  Patented Apr. 29, 1913.

Application filed August 24, 1912. Serial No. 716,922.

*To all whom it may concern:*

Be it known that I, CHARLES E. GRIFFITH, a citizen of the United States, residing at Philadelphia, in the county of Philadelphia and State of Pennsylvania, have invented certain new and useful Improvements in Car Doors, of which the following is a specification, reference being had to the accompanying drawings.

This invention relates to doors and more particularly to car doors.

The principal object of the invention is the provision of a door of the above stated character which may be readily and quickly locked in closed position and which upon the releasing of the lock thereof may be quickly and conveniently slid into an open position.

A further object of the invention is the provision of a car door including means adapted to lock and retain the door in closed position and which when unlocked serves to force the car door out of alinement with the car wall whereby the car door may be readily moved or slid into an open position.

A still further object of the invention is the provision of a car door provided on opposite sides with metallic facing strips adapted to overlie the side edges thereof and the edges of the car whereby the door will be prevented from being forced or pried open.

A still further object of the invention is the provision of a car door adapted to be suspended for movement upon guide tracks arranged above and below the door, said tracks converging or narrowing at their forward ends whereby the forward portion of the door will be guided inwardly into alinement with the car wall when the door is moved to a closed position.

With these and other objects in view as will appear as the description proceeds, the invention comprises various novel features of construction, combination and arrangement of parts as will be more fully described and set forth with particularity in the appended claims.

Referring to the drawings: Figure 1 is a side elevation of a portion of the car showing my improved door applied thereto in closed position; Fig. 2 is a section taken on the line 2—2 of Fig. 1; Fig. 3 is a similar view showing the door partially opened; Fig. 4 is an enlarged transverse sectional view of the cam actuating means; Fig. 5 is an enlarged detail sectional view taken through Fig. 2; Fig. 6 is a vertical transverse sectional view taken on the line 6—6 of Fig. 1, looking in the direction of the arrow; and Fig. 7 is a sectional plan view taken on the line 7—7 of Fig. 1.

Similar characters of reference are used to denote like parts throughout the accompanying drawings and the annexed specification.

Referring more particularly to the drawings, the reference character 1 designates the longitudinal sills of the car body upon which are arranged the floor 2 and the roof 3, respectively. Arranged to extend vertically between the sills 1 and in spaced relation to one another are door posts 4 and 5 respectively, adapted to provide the usual form of door way in the side of the car. The car is also provided upon the outer face of the sills 1 with a side wall 6. The wall 6 extends forwardly over the front face of the door post 4 to a point adjacent the inner front edge of said post and is provided upon its outer face with a vertically extending facing strip 7 which is secured to the car wall by any suitable means such as screws or bolts, and projects inwardly beyond the inner face of the door post 4, thus providing a rabbet adapted to receive and seat the forward vertical edge of the car door 8.

The door 8 may be formed of any suitable material, and in this instance is constructed of wood and lined or faced upon its inner side with sheet iron as shown at 9, the latter being suitably secured to the door through the medium of screws or bolts. Arranged transversely of the door and upon the outer side thereof are facing strips 10 which are securely screwed or bolted thereto. Arranged upon the inner face of the door adjacent the forward edge thereof is a vertically extending stop strip 11, which latter is adapted to limit the opening movement of the car door by its engagement with the opposite side of the door way.

Like the construction above described, the car wall 6 overlaps the door post 5 to a point adjacent its inner front edge, as clearly shown in Figs. 2 and 3 of the drawings. A facing strip 12 is secured to the rear vertical edge of the door through the medium of suitable fastening devices such as screws or bolts and is adapted to project rearwardly of the door edge to overlap the adjacent edge of the car wall 6 when the door is arranged in closed position.

The car wall 6 adjacent the door post 5 is cut away as shown at 13, clearly in Fig. 5 of the drawings, and is adapted to receive a correspondingly shaped counter-sunk bearing plate 14. A revoluble shaft 15 extends through the bearing plate 14 at the upper end thereof and projects through the car wall 6 and is squared on its inner terminal end, as clearly shown in Fig. 5 of the drawings. A stop shoulder 16 is arranged upon the inner squared end of the shaft 15, and is adapted to limit the outward sliding movement thereof, for a purpose that will presently appear. The inner end of the shaft 15 has arranged eccentrically thereon a disk 17, which latter is arranged in a suitably formed rectangular slot 18 of a cam actuating member 19 for relative movement with respect to said member 19. A cotter pin or other suitable fastening device 20 is passed through the end of the shaft 15 to prevent the disk 17 from accidentally working off thereof. As shown in Fig. 4, the cam actuating member 19 is pivotally secured at its rear end upon a stud 21 projecting inwardly from the inner face of the car wall 6. The intermediate portion of the member 19 is enlarged and provided with the above mentioned slot 18, the forward end of the member being reduced and adapted to project through a slot 22 formed in the door post 5 and into engagement with a slot 23 formed in and intermediate the ends of a suitable drag link 24. This drag link 24 has its opposite ends pivotally connected to door actuating cams 25 at their inner ends, said cams being pivoted intermediate their ends to the upright or vertical face of the door post 5, as clearly shown in Fig. 6 of the drawings. A facing strip 21' is arranged adjacent the door post 5 in spaced relation thereto, and is adapted to overlie the drag link 24 and the actuating cams 25 so as to protect said parts. The outer end of the shaft 15 is formed to provide an eye 26 to which is pivotally connected a hasp 27, the forward end of the latter being curved outwardly and provided with a slot 28 adapted to receive a staple 29 secured to the car door, through which a suitable lock or car seal may be fastened to hold the door positively in closed position, or to show whether the same has been tampered with.

The door 8 is suspended through the medium of pulley hangers 30 and 31 upon a guide track 32, the latter being secured to the car wall at a point above the door way thereof, and has its forward end narrowed or inclined inwardly, as clearly shown in Fig. 7. A guide track 33 is secured to and beneath the lower sill 1 of the car and has its forward end narrowed similar to the forward end of the upper guide track 32. Guide tracks 34 are secured to the lower edge of the door, and extend inwardly and upwardly behind a depending flange 35 of the right angular guide track 33.

It will be noted that the hanger pulley 30 is of smaller size than the hanger pulley 31, the actual pulley in the latter, of course, being larger than the pulley contained in the former and through this medium, it is possible for the inner end of the door 8 to be moved outwardly by the cam 25. It is apparent that in order to move the door from its closed to its open position, the inner end of said door must be moved outwardly and this enlarged hanger pulley readily permits this required movement. After this movement of the inner end of the door is had, said door may be readily guided to the outer face of the side wall of the car through the medium of the inclined or convergent portion of the track 32.

In the operation of the invention and assuming the door to be closed, the hasp 27 is swung outwardly upon its pivot or hinge and then lowered from a horizontal to a vertical position into alinement with the counter-sunk plate 14 where the shaft 15 and the hasp 27 may be pushed inwardly to seat within the counter-sunk plate 14 so as to lie flush with the outer face of the car wall. By this operation it will be manifest that the revolving of the shaft 15 will cause the disk 17 carried thereby to move the cam actuating member 19 downwardly, and by reason of its connection with the drag link 24, the cams 25 will be moved upwardly into engagement with the inner face of the car door to force the latter out of alinement with the car wall whereby it may be slid rearwardly into an open position. When it is desired to close the door, the latter is moved forwardly to its closed position, the construction of the forward ends of the guide tracks causing the forward end of the door to move inward into alinement with the car wall. After the door has been moved to its closed position the hasp 27 is pulled outwardly and swung upwardly to a horizontal position, as shown in Fig. 1, whereby the cam actuating member 19 will swing upwardly, moving the drag link 24 upwardly and causing the cams 25 to move inwardly to allow the rear vertical edge of the door to be pushed into alinement with the car wall whereby the forward end of the hasp 27 may be engaged with the staple 29 for sealing the car door.

From the foregoing description, taken in connection with the accompanying drawings, the advantages of construction and the method of operation, together with the device which I now consider to be the best embodiment thereof, will be readily understood by those skilled in the art to which the invention relates, and while I have described the principle of operation of the invention, I desire it to be understood that the device shown is merely illustrative, and that such changes may be made when desired as are within the scope of the appended claims.

Having thus fully described the invention what I claim as new is:

1. The combination with a car body; of a sliding door adapted, when closed, to rest in engagement with the car wall, a plurality of cams carried on the car body and adapted for engagement with the inner face of said door to force one end of the same out of alinement with the car wall, a cam operated member, and means coöperating with said cam operating member for actuating the latter.

2. The combination with a car body; of a sliding door adapted, when in its closed position to rest in alinement with the car wall, a pair of cams fulcrumed on the car body and adapted for engagement with the inner face of the door at one end thereof, connecting means between said cams, a cam actuating member pivotally carried on the walls of the car body and having connection with said connecting means, a hasp pivotally carried on the car body, and means in connection with said hasp to operate said cam actuating means upon the movement of the former, whereby the one side edge of said door may be forced out of alinement with the car body upon the disposition of said hasp to one position.

3. The combination with a car body, of a sliding door adapted to rest in alinement with the car wall, a pair of cams pivotally mounted upon the door post of the car adjacent the rear edge of the car door, a link connecting said cams, a cam actuating member connected to said link, a hasp pivotally connected to said member for relative movement therewith and adapted to actuate the said member to cause the cams to force the door out of alinement with the car wall.

4. The combination with a car body, of a sliding door therefor, a pair of cams pivotally connected to the door post of the car, a drag link connecting said cams and provided intermediate its ends with a slot, a cam actuating member pivotally mounted at one end to the car wall and having its other end projecting into the slot of the said link, said member being provided intermediate its ends with a slot, a revoluble shaft provided with an eccentric disk extending through said last named slot, and a hasp pivotally connected at one end to said shaft and adapted to actuate the latter, the forward end of said hasp being provided with a slot adapted to receive suitable fastening means carried by the car door.

In testimony whereof I have hereunto affixed my signature in the presence of two witnesses.

CHARLES E. GRIFFITH.

Witnesses:
RICHARD TAYLOR,
BENVILLE C. KEELER.